United States Patent
Antal et al.

(10) Patent No.: US 6,315,002 B1
(45) Date of Patent: Nov. 13, 2001

(54) HIGH PRESSURE FLEXIBLE HOSE STRUCTURE AND METHOD OF MANUFACTURE

(76) Inventors: Sandor Antal, 1125 Budapest, Daniel u.48; Sandor Gelencser, 1015 Budapest, Batthyany u.46; Tibor Nagy, 1028 Budapest, Szepesi u. 5; Istavanne Seregely, 2030Erd, Gyertyanfa u. 5, all of (HU)

(*) Notice: Subject to any disclaimer, the term of this patent is extended or adjusted under 35 U.S.C. 154(b) by 0 days.

(21) Appl. No.: 09/159,051

(22) Filed: Sep. 23, 1998

(30) Foreign Application Priority Data

Sep. 23, 1997 (HU) .................................................. 9701571

(51) Int. Cl.[7] .................................................. F16L 11/10
(52) U.S. Cl. .................... 138/109; 138/125; 138/127; 138/134; 138/136
(58) Field of Search .................... 138/109, 125, 138/127, 134, 136

(56) References Cited

U.S. PATENT DOCUMENTS

| | | | |
|---|---|---|---|
| 3,531,143 | * | 9/1970 | Horvath et al. . |
| 3,977,440 | * | 8/1976 | Phillippi ........................ 138/130 |
| 4,367,889 | * | 1/1983 | Redl ............................ 138/127 |
| 4,567,916 | * | 2/1986 | Antal et al. .................... 138/109 |
| 4,666,191 | * | 5/1987 | Sotelo et al. .................. 138/109 |
| 4,688,604 | | 8/1987 | Griffiths . |
| 4,895,185 | * | 1/1990 | Champleboux et al. ........ 138/109 |
| 5,061,826 | * | 10/1991 | MacCulloch et al. .......... 138/109 |
| 5,297,586 | * | 3/1994 | McIntosh ..................... 138/109 |
| 5,332,049 | * | 7/1994 | Tew ............................ 138/109 |
| 5,361,806 | * | 11/1994 | Lalikos et al. ................ 138/109 |
| 5,443,099 | * | 8/1995 | Chaussepied et al. .......... 138/109 |
| 5,638,869 | * | 6/1997 | Zaborszki et al. ............. 138/109 |
| 5,934,335 | * | 8/1999 | Hardy .......................... 138/134 |

FOREIGN PATENT DOCUMENTS 2 214 852   1/1973  (FR) .

OTHER PUBLICATIONS

API Specification 17J for unbounded flexible pipe, first edition, December, 1977.

* cited by examiner

Primary Examiner—James Hook
(74) Attorney, Agent, or Firm—Mathews, Collins, Shepherd & Gould,P.A.

(57) ABSTRACT

A flexible hose with one or more couplings, the hose generally having an inner diameter of greater than 50 mm, the hose typically equipped with a plastic liner, steel reinforcing layers, a cover, steel sleeves inside of the couplings, a sealing compound and a screw for adjusting pressure. A section of the plastic inner liner extends into a sealing area. The section of the inner liner is connected to the coupling by the sealing compound such that the connection cannot be broken by nondestructive methods.

13 Claims, 3 Drawing Sheets

HIGH PRESSURE FLEXIBLE HOSE STRUCTURE AND METHOD OF MANUFACTURE

FIELD OF THE INVENTION

The present invention relates to a high pressure, flexible hose structure (pipe henceforth) with couplings, wherein the pipe typically has an inner diameter greater than 50 mm, and method for its manufacture. The pipe is specially suitable for the transportation of water, mud, mixtures of liquids and gases and pure gases.

BACKGROUND OF THE INVENTION

It is known, that flexible pipes with diameters larger than 50 mm are used in large quantities in several areas of industry, for example, in onshore and off-shore oil mining.

These flexible pipes must possess extremely complex properties because they have to withstand chemical and mechanical effects caused by the gases and liquids transported by these pipes. Flexible pipes must also withstand many environmental effects. For example, pipes used in off-shore oil mining must withstand the hydrostatic pressure of sea water, the stresses generated by ocean waves, and the impairing effects of sea water and sunshine.

During the years, two fundamentally different flexible pipe structures have been developed to withstand the above mentioned h effects. They are non-bonded and bonded flexible pipe structures.

Non-bonded flexible pipe structures typically have a hose body comprised of many different structural parts that are not permanently joined together. A widely used non-bonded structure for flexible pipes is disclosed in U.S. Pat. No. 4,549,581. The U.S. Pat. No. 4,549,581 describes a flexible pipe having an inner plastic layer, a low pitch inner steel layer, high pitch outer steel layers and an outer plastic layer, which are not permanently joined together. This construction permits the adjacent layers to move in relation to each other during the movement of the pipe. Additionally, the adjoining parts forming the coupling of the pipe, which ensure sealing, are only in contact. No chemical bonding is provided between them.

Non-bonded flexible pipe structures (having plastic, liquid and/or gas barrier layers or inner liners) can be advantageously manufactured in several kilometer lengths, without using intermediate couplings. Additionally, the plastic inner liner makes these pipes especially suitable for transporting gases or mixtures of liquids and gases.

Unfortunately, the semi-crystalline plastic inner liner and cover of non-bonded pipe structures tend to elude stress. This results in creep that increases due to high speed flow and temperature. Creep may cause the failure of the sealing, which leads to the destruction of the pipe.

Another disadvantage of flexible pipes with non-bonded structures is that the annular space enclosed by the inner liner and cover is liquid permeable. Therefore, in case of damage to the cover, inpouring sea water will cause the corrosion of metallic parts in an annular space enclosed by the inner liner and the cover. Still another disadvantage of non-bonded structures is that the plastic inner liner is not connected permanently to adjacent structural parts, which may result in out sliding or lengthening and the wrinkling of the inner liner due the high temperature, pressure and speed of flow of the transported medium. This in turn, can lead to the destruction of the flexible pipe.

The above advantages and disadvantages apply not only to the hoses described in U.S. Pat. No. 4,549,581, but generally to all non-bonded flexible pipes structures.

Bonded flexible pipe structures typically have a hose body comprised of many different structural parts that are permanently joined together. More specifically, the structural parts between the inner liner and the outer barrier layer (cover) of the flexible pipe are permanently joined or connected so that the parts can not be separated with nondestructive methods.

Bonded flexible pipe structures generally include reinforcements in the form of steel cables or wires and textiles. The inner and outer barrier layers (inner liner and cover) and the layers which fasten the different parts are made of elastomers. The permanent connection between the parts is created by forming a network.

A widely used bonded structure for flexible pipes is disclosed in HU Patent 183,563. The flexible pipe structures disclosed in this patent have been designed for the delivery of gases or mixtures of liquids and gases. In each of these structures, the first member in the inside of the flexible pipe, from the inside toward the outside, is a flexible stripwound metal pipe (e.g. steel stripwound). This flexible stripwound metal pipe serves as a protective layer against the effects of gas diffusion, such as the blistering of the elastomer inner liner. This also means that an additional member, such as a flexible stripwound metal pipe, must be built into the flexible pipes manufactured with elastomer inner liners, which are used for the delivery of gases or mixtures of liquids and gases. These additional members provide protection against the blistering and delamination of the inner liner.

One of the advantages of bonded flexible pipe structures is that the reinforcing members in the wall structure are sealed from the corrosive media. Another advantage is that the structural parts of the pipe structure are joined firmly, therefore, undesirable creeping effects can not appear. This makes forming a reliable and persistent sealing possible between the hose body of the flexible pipe and the couplings at its ends. A further advantage of this structure is that the high temperature, pressure, and speed of flow of the transported medium cannot detach the parts of the hose structure (especially the inner liner) from their surroundings and scrape them off.

However, the elastomer-based inner liners of bonded flexible pipe structures are less able to resist the harmful effects caused by the flow of the transported high pressure and high velocity gases or mixtures of liquids and gases, than inner liners made of thermoplastic to materials. This is particularly true in cases when sudden pressure decreases frequently occur during their utilization.

At the present level of technology there are no known flexible pipes comprised of an inner liner made of thermoplastic material, that have partially or fully connected joining members that can not be broken by nondestructive methods, and that have a sealed area between the hose body and the couplings that is maintained even if creeping occurs on the section of the semi-crystalline structured inner liner which is in this sealed area.

The authoritative API 17J and ISO 13628-2 standards only apply to thermoplastic based flexible pipes with non-bonded structures.

The API 17K standard, which is currently in preparation will contain requirements for the rubber-based flexible pipes with bonded structures.

There are no known flexible pipes, which are fitted with coupling, that have a bonded structure and are manufactured with a thermoplastic gas barrier layer.

The object of the present invention is, therefore, to develop a flexible pipe comprising a thermoplastic inner liner, and if necessary, a flexible stripwound metal pipe in order to overcome the disadvantages of the presently known flexible pipe structures, wherein the permanent connection between the structural parts of the flexible pipe, the coupling and the thermoplastic inner liner is established by the network forming of an elastomer.

SUMMARY OF THE INVENTION

The invention is based on the concept that the sealing between the flexible pipe and the couplings will provide a persistent and suitable sealing effect if there is a connection (not breakable by nondestructive methods) between the coupling, the inner liner extending into the sealing area, and the elastomer based sealing compound. This ensures that the harmful effects of creeping are avoided.

The flexible pipe of the present invention is suitable for the delivery of gases or mixtures of liquids and gases under high pressure. The basis of the flexible pipe of the invention is that the inner liner, which is made of thermoplastic material, is partially or fully irreversibly connected to the members adjacent to it from the inside and the outside. Additionally, other parts may be joined to each other by permanent connection through the network forming of the elastomer layers. Furthermore, the sealing between the flexible hose body and the couplings is ensured by the permanent connection, which is formed by the network forming of the elastomer sealing compound under pressure, between the interface of the sealing area and the section of the inner liner of the hose, which extends into the sealing area. The preferred semi-crystalline plastic inner liners are for example, polypropylene, polyethylene which may be partially or completely crosslinked, different polyamides, such as PA12 and PA11, and their plasticized forms and copolymers of polyamides, polyvinylidene-fluoride, polyester based thermoplastic elastomers, etc.

BRIEF DESCRIPTION OF THE DRAWINGS

The flexible pipe of the invention is illustrated by drawings for the better understanding, where.

DETAILED DESCRIPTION OF THE DRAWINGS

Figure 1:
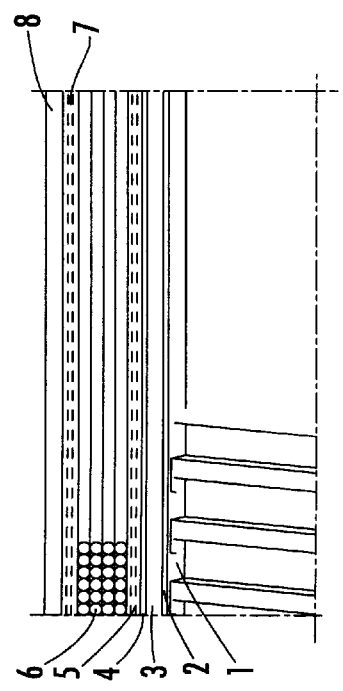
FIG. 1 shows a section of a hose body of a flexible pipe with an inner, flexible stripwound metal pipe support.
Figure 3:
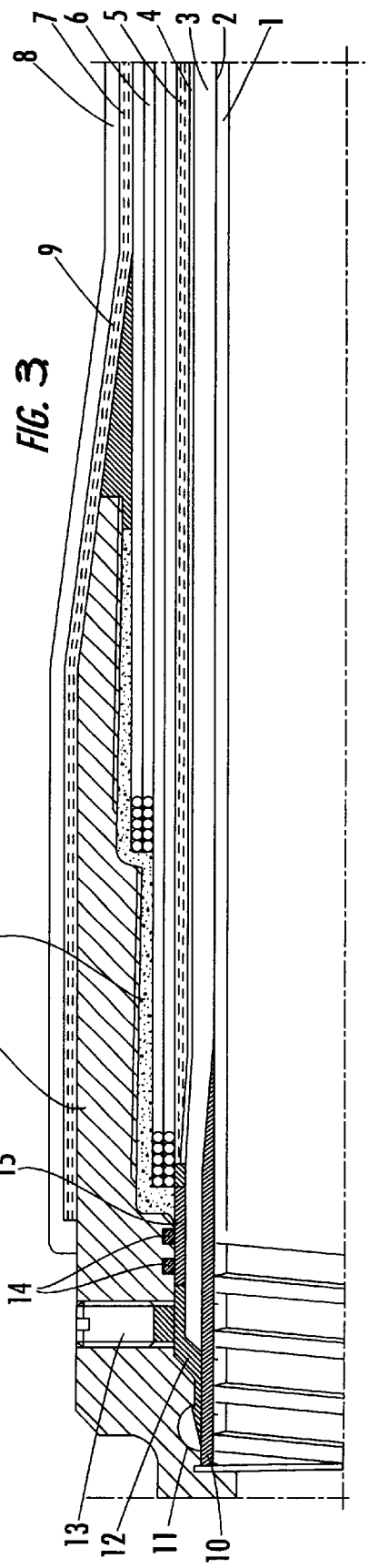
FIG. 3 shows a section of the end of a flexible pipe with a coupling.

FIGS. 1 and 3, show a hose body of the flexible pipe P of the present invention. The innermost first ply in the construction is flexible stripwound metal pipe (1). It is made from continuously interconnected pre-formed stainless steel band profiles, and has high flexibility and strength against outside loads. A cross-section of the flexible stripwound pipe can be seen in FIG. 6. Steel sleeve (10) can be welded on the end of the flexible stripwound pipe, which can be connected to hose coupling with swaging.

A steel sleeve (10) provides firm support for the thermoplastic inner liner (3). A metal hose coupling (16) is provided between the second layer of textile plies (7) and the cable reinforcement layers (6). (The other end of the hose can be provided with a second coupling.) A sealing compound (12) is irreversibly connected to an interfacing surface of a sealing area (24) in the coupling (16). A sealing element (11) prevents the sealing compound (12) from flowing away from the sealing area (24) during the curing phase of hose production. The sealing area (24) is bordered by a steel sleeve (15). Sealing rings (14) prevent the sealing compound (12) from contacting an adhesive resin (17) which connects the coupling (16) to the cable reinforcement layers (6). The adhesive resin (17) is preferably an epoxy resin. The pressure exerted by the sealing element (11) and sealing compound (12) in the sealing area (24) and the pressure exerted by the section of the thermoplastic inner liner (3) which extends into the sealing area (24), can be adjusted by a screw (13). This adjustment is necessary when the flexible pipe P is out of use for a long period of time because the over pressure decreases or disappears thereby resulting in a decreased sealing ability. Therefore, it is advantageous to increase the pressure in the sealing area (24) with the screw (13) before the flexible pipe P is put into use. An elastomer ply (9) seals a space located at the end of the coupling (16) where the flexible pipe P merges with the coupling (16).

The sealing between the flexible hose body of the pipe P and the couplings (16) is ensured by a permanent connection formed by the elastomer sealing compound (12) under pressure, between the interface of the sealing area (24) and the section of the inner liner (3) of the hose, which extends into the sealing area (24). More specifically, the sealing compound (12) is connected to the coupling (16) by a metal-rubber chemical bond and to the inner liner (3) by a plastic-rubber chemical bond.

Figure 4:
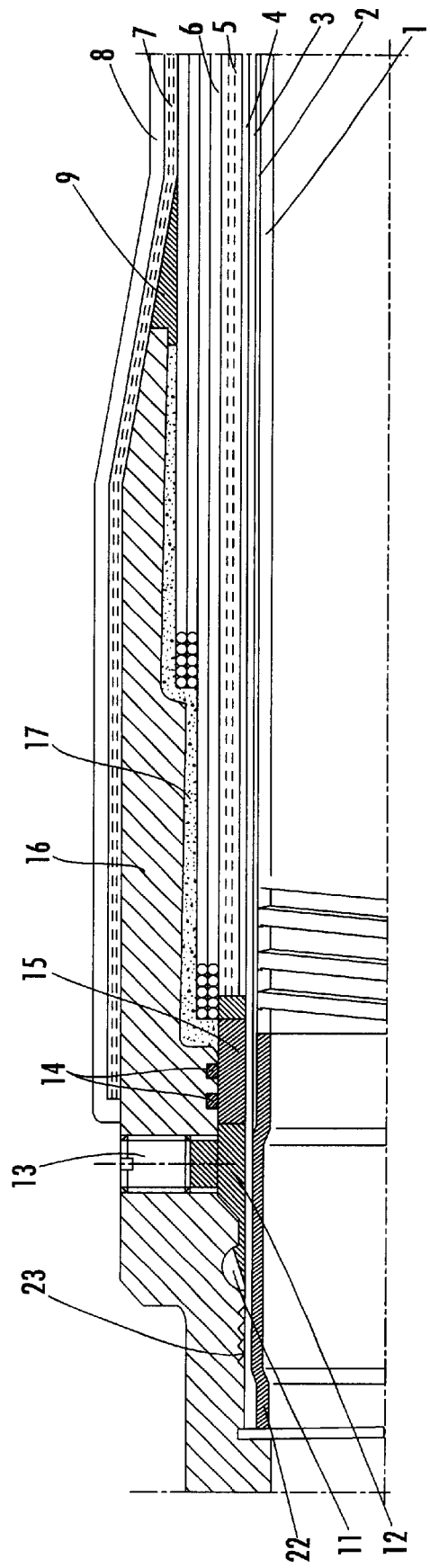
FIG. 4 shows an embodiment of the sealing area.

FIG. 4 shows an illustrative embodiment of a sealing system for the coupling (16). The sealing system comprises a sleeve (22) connected to the stripwound metal pipe (1). The sleeve (22) is swaged to the end of the thermoplastic inner liner (3) and into a toothed surface (25) of the coupling (16). This newly formed sealing decreases the stress on the sealing compound (12), thus, increasing its reliability and life time. The effectiveness of the swaged sealing can be improved further with an adhesive (23). A preferred adhesive can be, for example, an epoxy-resin (Skotch-Weld, Araldite AW 106).

The elastomer used as the sealing compound (12) is preferably an oil resistant type, such as polychloroprene, chlorinated polyethylene, nitrile-rubber or its hydrogenated derivative, flouro-rubber, epiclorohidrine-rubber based compound, crosslinked by sulfur or peroxides.

We have surprisingly found during the development of the elastomer based bonding layers (2), (4) that in the case of halogen, especially chlorine containing elastomers (e.g. chlorbutyl-CIIR, polychloroprene-CR, chlorinated polyethylene-CPE, etc.), a solid composition can be obtained by the addition of 10–80 phr (parts by weight per 100 resin) resorcin, or a known derivative of resorcin, and 10–200 parts by weight other known materials (e.g. fillers and other ingredients). This composition forms a suitable network without formaldehyde or a formaldehyde donor, or sulfur or a sulfur donor and it forms a chemical bond with polyamide and other elastomer based compositions, which preferably contain double bonds. The mechanical properties of the bonding material and also the adherence to other materials can be improved by the addition of 0.05–4 phr known quinoline derivatives.

The advantages of the flexible pipe of the invention, which is suitable for the transportation of high pressure gases and mixtures of liquids and gases, are mainly the following:

a.) The flexible stripwound metal pipe (1), which is inside the flexible pipe P, and the following thermoplastic inner liner (3), and the other members of the structure are joined partially or fully by a connection, thereby protecting the inner, stripwound metal pipe (1) and the thermoplastic inner liner (3) from the scraping effects of the transported medium;

b.) The reliable sealing between the flexible pipe P and the coupling is ensured by the irreversibly connected members in the sealing area (24), thereby the harmful effects of creeping of the thermoplastic inner liner (3), which extends the sealing area (24), are avoided;

c.) The pressure in the sealing area (24) can be easily adjusted;

d.) Extrusion of the elastomer based sealing compound (12) is prevented by the special sealing element (11);

e.) The gas barrier properties of the thermoplastic inner liner (3) makes the complicated internal gas leading ply of prior art bonded flexible pipe structures unnecessary;

f.) A double sealing system is established by the swaging of the plastic inner liner (3) and by the chemical bonding between the plastic-rubber-metal system.

The flexible pipe structure of the present invention is fundamentally different from non-bonded flexible pipe structures because there are connections in the structure of the hose and in the sealing area which cannot be broken by nondestructive methods.

Figure 5:
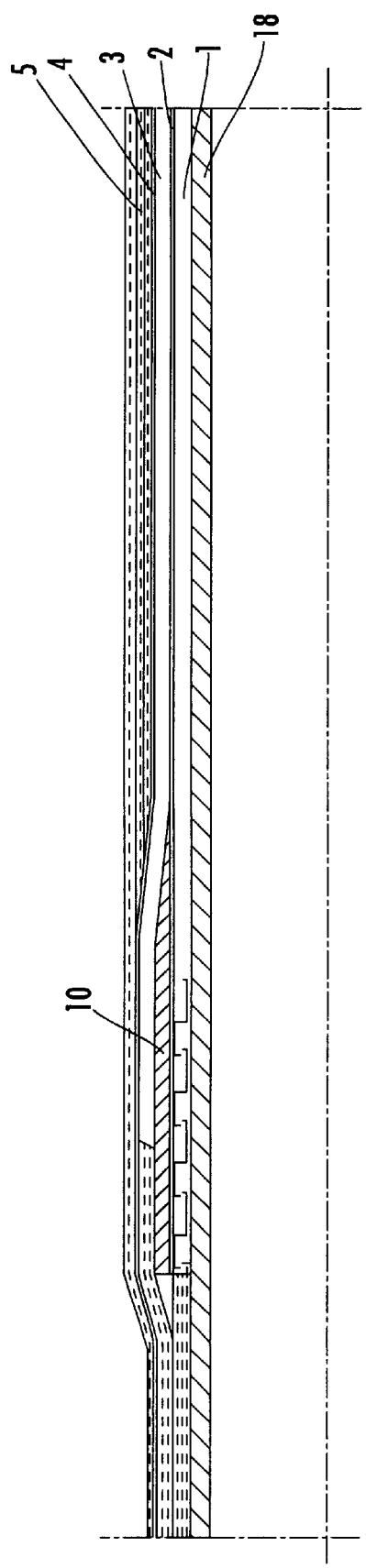
FIGS. 5 and 6 show an embodiment of the sealing system used for preventing steam from entering during the manufacture of the flexible pipe.
Figure 6:
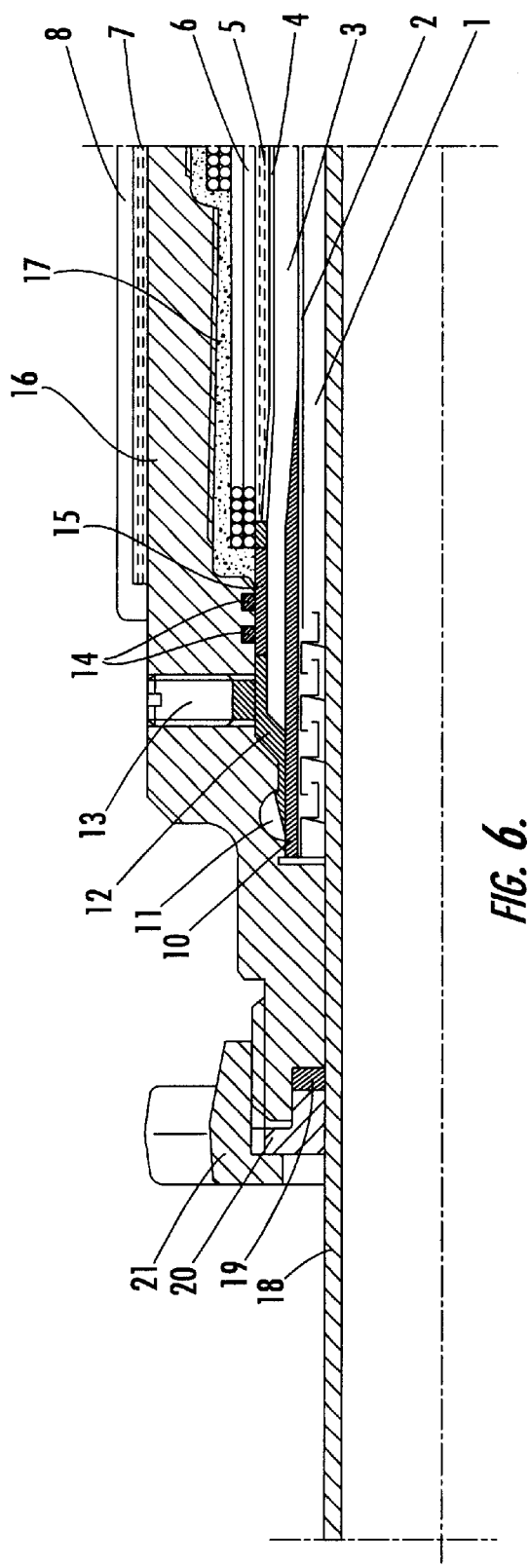

The flexible pipe structure of the present invention is also fundamentally different from bonded flexible pipe structures because the flexible pipe of the invention can be manufactured without the complex gas leading plies. The end of the section of the thermoplastic inner liner (3) extending into the sealing area (24) can be beveled in a 10°–80° angle to provide better adherence. The end of the thermoplastic inner liner (3) is supported by a sleeve, which may be swaged out. The extrusion of the sealing compound (12) is prevented by an element (11) which is self-sealing with increasing pressure. The pressure inside the sealing area (24) can be adjusted with a screw 13. The inner liner (3) may be swaged to the toothed surface of the coupling (16). Pipes with the above mentioned structures can be manufactured as follows. If heat curing is done conventionally in a curing autoclave, then hydrolysis of the material will ruin, foam and shrink the thermoplastic inner liner (3), which is highly sensitive to steam. We have found that this difficulty can be overcome by excluding steam. FIG. 5 shows one possible way to achieve this. The reinforcing, rubberized textile plies (5), (7) are firmly connected to a mandrel (18) during precuring and the connection is sealed. In FIG. 6, a sealing (19) is used during the final curing. The sealing is pressed by a nut (21) and a piston (20) in order to exclude steam.

In another method, the pipe of the invention can be manufactured by preventing the extrusion of the rubber material from the sealing area (24) with the sealing rings (11), (14). Curing is done by electric heating in this method, without steam.

The above methods ensure the perfect cooperation of the materials during the utilization of the flexible pipe, although these materials require dissimilar manufacturing techniques.

Figure 2:
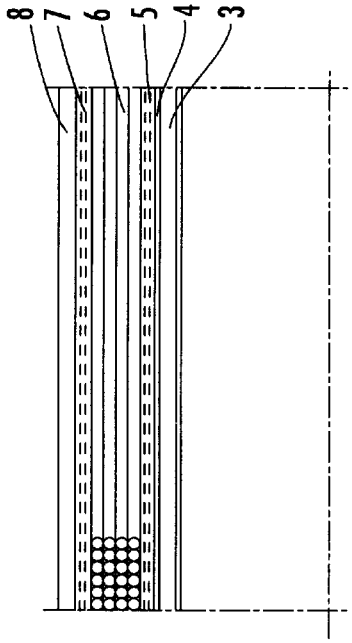
FIG. 2 shows a section of a flexible pipe without an inner, flexible stripwound metal pipe support.

FIG. 2 shows a hose body of a flexible pipe according to a second embodiment of the present invention. This hose body is substantially similar to the hose body shown in FIGS. 1 and 3 except that is does not include a flexible stripwound metal pipe.

The design of the present invention will be illustrated by the following example, for the better understanding of the manufacturing method. It should be noted however, that the exemplifying drawings and the following technological example are not meant to limit the scope of the invention and that any modification should be considered as part of the invention, in which the idea of the invention is used, even if some parts of the design or procedure differ from the above described.

EXAMPLE

According to the above described design and method we have manufactured a φ 76 mm inner diameter flexible pipe, the working pressure of which was 30 MPa. The thermoplastic inner liner, the wall thickness of which was 6 mm, was made of PA 11. Textile plies were built above it. The strength of the pipe was ensured by 4 plies of φ 45 mm diameter steel cables. Each cable ply was embedded in CR based compounds and the outer cover was also made of CR based rubber. The chemical bonding between thermoplastic inner liner and the structure above it was ensured by the following composition:

| Name of the material | Quantity per 100 part by weight of the elastomer |
|---|---|
| Polychloroprene-rubber average molecular weight 2 × 105 Mooney-viscosity $MV_{1+4}$ (100° C.) 40–50 | 100 |
| Resorcin | 75 |
| Hydrated silicone-dioxide BET surface 110–150 $m^2 \cdot g^{-1}$ | 75 |
| MgO Iodine adsorption 140–180 $mgJ \cdot g^{-1}$ | 2 |

The textile plies were connected to the mandrel during the precuring, so as to form a steam barrier. The precuring was carried out at 155° C. We built in the couplings and the sealing element, which prevents steam from entering between the coupling and the mandrel. Afterwards we cured the hose in several steps at temperatures between 120° C. and 155° C. During the curing the hose was covered with a textile in order to ensure the necessary pressure.

The pipe demonstrated exceptional flexibility, gas barrier properties and pressure resistance during the testing.

What is claimed is:

1. A flexible hose comprising:
   a semi-crystalline thermoplastic inner liner;
   at least one steel reinforcing layer surrounding the inner liner;
   at least one hose coupling disposed at an end of the hose and surrounding the at least one steel reinforcing layer;
   a sealing area defined between the at least one coupling and the inner liner;
   a sealing compound disposed in the sealing area; and
   a cover surrounding the coupling and the at least one steel reinforcing layer;
   wherein a section of the inner liner extends into the sealing area and said section is chemically connected in permanent connection to the coupling with an elastomeric network of the sealing compound, the sealing compound is connected to the coupling by a metal-rubber chemical bond and to the inner liner by a plastic-rubber chemical bond and the permanent connection cannot be broken by non-destructive methods.

2. The flexible hose of claim 1, further comprising a first steel sleeve firmly supporting the section of the inner liner and a second steel sleeve bordering the sealing area, the sleeves being bonded in the permanent connection by the sealing compound.

3. The flexible hose of claim 1, wherein an end of the thermoplastic inner liner is swaged onto a sealing surface of the coupling.

4. The flexible hose of claim 1, wherein an end of the thermoplastic inner liner is swaged up and glued to a sealing surface of the coupling.

5. The flexible hose of claim 1, further comprising a sealing element bordering the sealing area prevents the sealing compound from being extruded from the sealing area, the sealing element being self-sealing with increasing pressure.

6. The flexible hose of claim 1, further comprising at least one screw reciprocally moveable in the sealing area, the at least one screw enabling pressure in the sealing area to be selectively adjusted.

7. The flexible hose of claim 1, wherein an end of the thermoplastic inner liner is in the sealing area, the end being beveled at an angle ranging between 10° and 80° to the axis of the flexible pipe.

8. The flexible hose of claim 1, wherein the thermoplastic inner liner is at least partially covered with a rubber compound, the network of which was formed with 10–80 parts by weight per 100 rubber of resorcine.

9. The flexible hose of claim 1, wherein the thermoplastic inner liner is at least partially covered with a rubber compound, the network of which was formed with 10–80 parts by weight per 100 rubber of a resorcine derivative which contains 0.05–4 parts by weight per 100 rubber of quinoline.

10. The flexible hose of claim 1, wherein the thermoplastic inner liner is supported by a sleeve in the coupling and the sleeve is swaged out from inside.

11. The flexible hose of claim 1, further comprising a flexible stripwound metal pipe bonded to the thermoplastic inner liner with a cushion layer.

12. The flexible hose of claim 1, wherein the semi-crystalline thermoplastic inner liner, the at least one steel reinforcing layer surrounding, and the at least one hose coupling are at least partially connected to each other by a permanent connection.

13. The hose of claim 1 wherein said flexible stripwound pipe is formed of inter-connected profiles.

* * * * *